(12) United States Patent
Chen et al.

(10) Patent No.: US 11,188,345 B2
(45) Date of Patent: Nov. 30, 2021

(54) HIGH PERFORMANCE NETWORKING ACROSS DOCKER CONTAINERS

(71) Applicant: INTERNATIONAL BUSINESS MACHINES CORPORATION, Armonk, NY (US)

(72) Inventors: Qin Yue Chen, Shanghai (CN); Han Su, Shanghai (CN); Feifei Li, Shanghai (CN); Yu Zhuo Sun, Beijing (CN); Chao Jun Wei, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 393 days.

(21) Appl. No.: 16/442,999

(22) Filed: Jun. 17, 2019

(65) Prior Publication Data

US 2020/0394048 A1 Dec. 17, 2020

(51) Int. Cl.
*G06F 9/4401* (2018.01)
*G06F 15/173* (2006.01)
*G06F 9/455* (2018.01)

(52) U.S. Cl.
CPC ...... *G06F 9/4406* (2013.01); *G06F 15/17331* (2013.01); *G06F 9/45558* (2013.01); *G06F 2009/45587* (2013.01); *G06F 2009/45595* (2013.01)

(58) Field of Classification Search
CPC ..... G06F 15/17331; G06F 2009/45587; G06F 2009/45595; G06F 9/4406; G06F 9/45558
See application file for complete search history.

(56) References Cited

U.S. PATENT DOCUMENTS

| 2012/0216216 A1* | 8/2012 | Lopez Taboada | G06F 9/546 719/314 |
| 2015/0288763 A1* | 10/2015 | Kamper | H04L 69/161 709/212 |
| 2018/0123928 A1 | 5/2018 | Moradi | |
| 2018/0295036 A1 | 10/2018 | Krishnamurthy | |

FOREIGN PATENT DOCUMENTS

WO 2017097116 A1 6/2017

OTHER PUBLICATIONS

Yu et al., "FreeFlow: High Performance Container Networking" HotNets-XV, Proceedings of the 15th ACM Workshop on Hot Topics in Networks, Nov. 9-10, 2016. pp. 43-49.

* cited by examiner

*Primary Examiner* — Terrell S Johnson
(74) *Attorney, Agent, or Firm* — Cantor Colburn LLP; Teddi Maranzano

(57) ABSTRACT

A method for network communication across application containers in a computer server system includes executing, by a computer system, a host operating system (OS). The host OS is an instance of an OS. The host OS includes multiple application containers operatively coupled to a memory. The method further includes executing, by the host OS, a virtual network interface for each of the application containers. The method further includes implementing, by the host OS, a remote direct memory access (RDMA) transparently for communications amongst the application containers by utilizing shared memory communications.

20 Claims, 11 Drawing Sheets

```
Application send sizes used for well-suited connections:
Size                            # sends    Percentage
-----                           -------    ----------
1500 (<=1500):                       15           37%
4K (>1500 and <=4k):                  7           17%
8K (>4k and <= 8k):                   3            7%
16K (>8k and <= 16k):                 4           10%
32K (>16k and <= 32k):                8           20%
64K (>32k and <= 64k):                3            7%
256K (>64K and <= 256K):              1            2%
>256K:                                0            0%

Application receive sizes used for well-suited connections:
Size                            # recvs    Percentage
-----                           -------    ----------
1500 (<=1500):                        8           38%
4K (>1500 and <=4k):                  3           14%
8K (>4k and <= 8k):                   2           10%
16K (>8k and <= 16k):                 2           10%
32K (>16k and <= 32k):                4           20%
64K (>32k and <= 64k):                1            5%
256K (>64K and <= 256K):              1            5%
>256K:                                0            0%
```

HIGH PERFORMANCE NETWORKING ACROSS DOCKER CONTAINERS

BACKGROUND

The invention relates generally to application container technology and, more particularly, relates to enhancing application container networking performance.

Container technology is becoming more popular and in container production environments, several hundred to thousands of containers can be interconnected. Traditionally, containers utilizing a virtual network topology communicate with each other over a transmission control protocol/Internet protocol (TCP/IP) network. However, large numbers of containers creates significant network performance issues. For example, virtual network topology can slow down network performance and large number of containers can cause substantial network performance issues and increase network central processing unit (CPU) utilization. What is needed is greater throughput requiring less response time and CPU costs while maintaining container isolation.

SUMMARY

According to one or more embodiments of the present invention, a method for network communication across application containers in a computer server system includes executing, by a computer system, a host operating system (OS). The host OS is an instance of an OS. The host OS includes multiple application containers operatively coupled to a memory. The method further includes executing, by the host OS, a virtual network interface for each of the application containers. The method further includes implementing, by the host OS, a remote direct memory access (RDMA) transparently for communications amongst the application containers by utilizing shared memory communications.

According to one or more embodiments of the present invention, a system includes multiple computer systems, each computer system including a memory, and a processor coupled with the memory. A first computer system from the computer systems performs a method for providing communication between application containers hosted in the multiple computer systems. The method includes executing a host operating system (OS). The host OS is an instance of an OS. The host OS includes multiple application containers operatively coupled to a memory. The method further includes executing, by the host OS, a virtual network interface for each of the application containers. The method further includes implementing, by the host OS, a remote direct memory access (RDMA) transparently for communications amongst the application containers by utilizing shared memory communications.

According to one or more embodiments of the present invention, a computer program product includes a computer readable storage medium having program instructions embodied therewith. The program instructions are executable by a computer processor to cause the computer processor to perform a method for implementing networking communication across application containers in a computer server system. The method includes executing, by a computer system, a host operating system (OS). The host OS is an instance of an OS. The host OS includes multiple application containers operatively coupled to a memory. The method further includes executing, by the host OS, a virtual network interface for each of the application containers. The method further includes implementing, by the host OS, a remote direct memory access (RDMA) transparently for communications amongst the application containers by utilizing shared memory communications.

Additional features and advantages are realized through the techniques of the invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings, in which:

FIG. 9 depicts an example sampling result according to one or more embodiments of the present invention;

Figure 1:
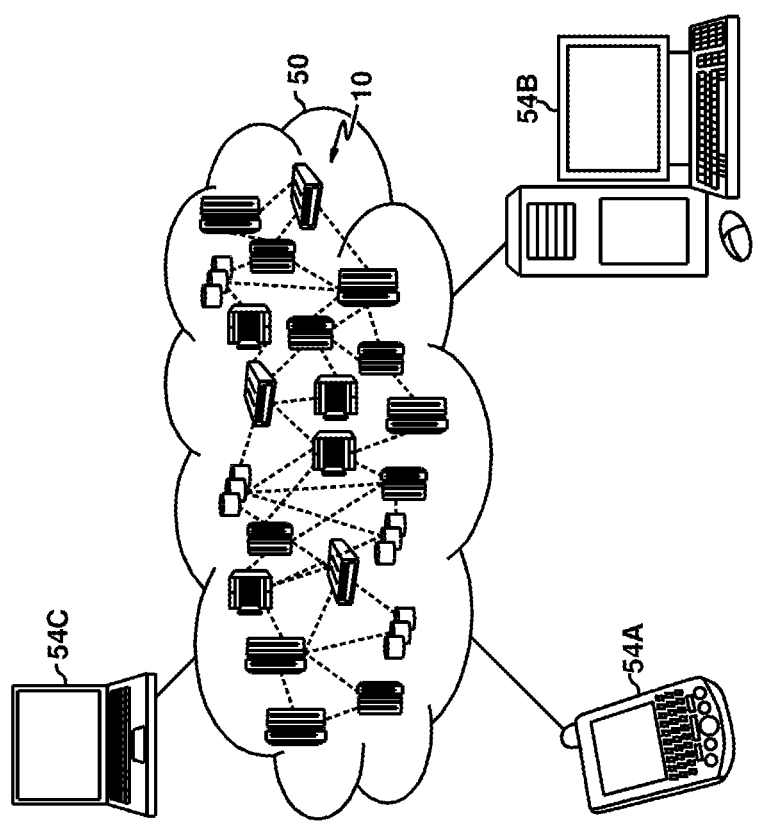
FIG. 1 depicts a cloud computing environment according to one or more embodiments of the present invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computer systems and specific computer programs to implement the various technical features described herein are well known. Accordingly, in the interest of brevity, many conventional implementation details are only mentioned briefly herein or are omitted entirely without providing the well-known system and/or process details.

The present invention may be implemented in one or more embodiments using cloud computing. Nonetheless, it is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or some other computer system or device, may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-54C shown in FIG. 1 are intended to be illustrative only and that computing nodes 10 and cloud computing environment 50 can communicate with any type of computerized device over any type of network and/or network addressable connection (e.g., using a web browser).

Figure 2:
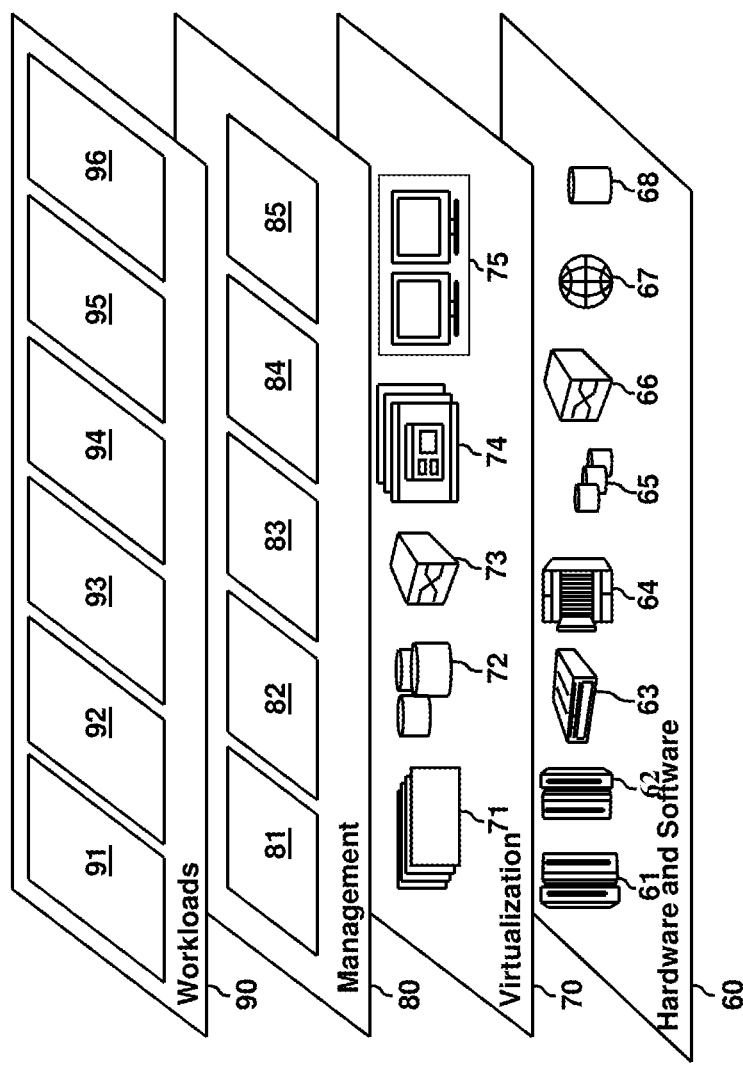
FIG. 2 depicts abstraction model layers of a cloud computer environment according to one or more embodiments of the present invention.

Referring now to FIG. 2, a set of functional abstraction layers provided by cloud computing environment 50 is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61, RISC (Reduced Instruction Set Computer) architecture based servers 62, servers 63, blade servers 64, storage devices 65, and networks and networking components 66. In some embodiments, software components include network application server software 67 and database software 68.

Virtualization layer 70 provides an abstraction layer from which the following examples of virtual entities may be provided: virtual servers 71, virtual storage 72, virtual networks 73, including virtual private networks, virtual applications and operating systems 74, and virtual clients 75.

In one example, management layer 80 may provide the functions described below. Resource provisioning 81 provides dynamic procurement of computing resources and other resources that are utilized to perform tasks within the cloud computing environment. Metering and pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91, software development and lifecycle management 92, virtual classroom education delivery 93, data analytics processing 94, transaction processing 95, and learning model processing 96, for performing one or more processes for networking across application containers in a platform as a service (PaaS) system as described herein.

Figure 3:
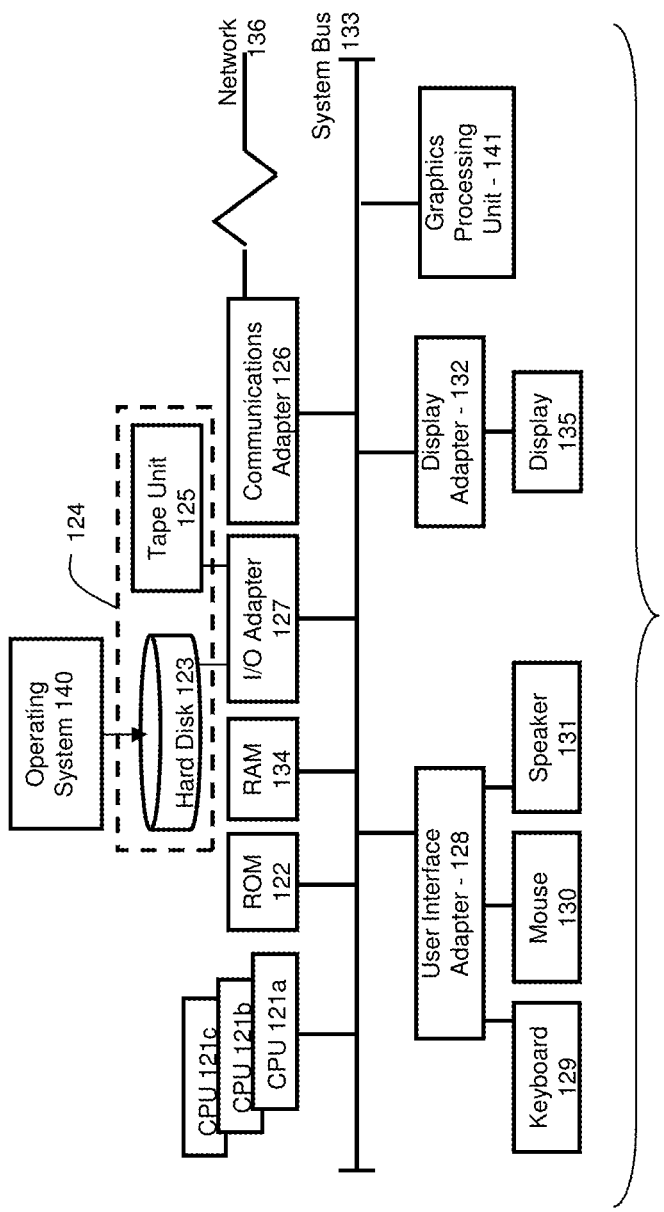
FIG. 3 depicts a block diagram illustrating an exemplary computer processing system that may be utilized to implement one or more embodiments of the present invention.

Referring to FIG. 3, there is shown an embodiment of a processing system, commonly referred to as a computer system 100, which communicates over a communications network to one or more nodes 10 of the cloud computing environment 50 for implementing the teachings herein. The processing system is a computer system 100 that has one or more central processing units (processors) 121a, 121b, 121c, etc. (collectively or generically referred to as processor(s) 121). In one or more embodiments, each processor 121 may include a reduced instruction set computer (RISC) microprocessor. Processors 121 are coupled to system memory (RAM) 134 and various other components via a system bus 133. Read only memory (ROM) 122 is coupled to the system bus 133 and may include a basic input/output system (BIOS), which controls certain basic functions of computer system 100.

FIG. 3 further depicts an input/output (I/O) adapter 127 and a network adapter 126 coupled to the system bus 133. I/O adapter 127 may be a small computer system interface (SCSI) adapter that communicates with a hard disk 123 and/or tape storage drive 125 or any other similar component. I/O adapter 127, hard disk 123, and tape storage device 125 are collectively referred to herein as mass storage 124.

Operating system 140 for execution on the computer system 100 may be stored in mass storage 124. However, the operating system 140 may also be stored in RAM 134 of the computer system 100. Operating systems according to embodiments of the present invention include, for example, UNIX™, Linux™, Microsoft XP™, AIX™, and IBM's i5/OS™.

A network adapter 126 interconnects bus 133 with an outside network 136 enabling the computer system 100 to communicate with other such systems. A screen (e.g., a display monitor) 135 is connected to system bus 133 by display adaptor 132, which may include a graphics adapter to improve the performance of graphics intensive applications and a video controller. In one embodiment, adapters 127, 126, and 132 may be connected to one or more I/O busses that are connected to system bus 133 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 133 via user interface adapter 128 and display adapter 132. A keyboard 129, mouse 130, and speaker 131 all interconnected to bus 133 via user interface adapter 128, which may include, for example, a Super I/O chip integrating multiple device adapters into a single integrated circuit.

In exemplary embodiments, the computer system 100 includes a graphics processing unit 141. Graphics processing unit 141 is a specialized electronic circuit designed to manipulate and alter memory to accelerate the creation of images in a frame buffer intended for output to a display. In general, graphics processing unit 141 is very efficient at manipulating computer graphics and image processing and has a highly parallel structure that makes it more effective than general-purpose CPUs for algorithms where processing of large blocks of data is done in parallel.

Thus, as configured in FIG. 3, the computer system 100 includes processing capability in the form of processors 121, storage capability including RAM 134 and mass storage 124, input means such as keyboard 129 and mouse 130, and output capability including speaker 131 and display 135. In one embodiment, a portion of RAM 134 and mass storage 124 collectively store the operating system to coordinate the functions of the various components shown in FIG. 3.

One or more embodiments include a Platform-as-a Service (PaaS) system implemented on one or more different cloud computing nodes 10 in a cloud such as cloud computing environment 50. Alternatively, the PaaS system may be implemented on one or more different physical nodes. Host operating systems (OSs) maintained on the nodes include an application container software system such as Docker, which may simply be referred to as a Docker tool, for implementing distributed applications. Docker is a platform for developers and system administrators to develop, deploy, and run applications with containers. A "container" is a runtime instance of an image of an OS—what the image becomes in memory when executed (that is, an image with a state, or a user process). A container is launched by running an image. An image is an executable package that includes everything needed to run an application—the code, a runtime, libraries, environment variables, and configuration files.

The Docker tool virtualizes the OS, splitting it up into virtual compartments, referred to as application containers or simply containers, to run container-based applications or workloads in isolation which then allows portions of code to be put into smaller, easily transportable pieces that can run in different environments. Although utilizing such a Docker tool in a PaaS system speeds up the process of building, testing and deploying applications, traditional transmission control protocol/Internet protocol (TCP/IP) processing is utilized in order for application containers to communicate with another different application container with a single host OS or between different host OSs.

The computer system 100 can be used as a node in a cloud computing platform. The nodes can use RDMA over Converged Ethernet (RoCE), which is a standard protocol that enables RDMA's data transfer over Ethernet networks, allowing transport offload with hardware RDMA engine implementation and superior performance. RoCE is a standard protocol defined in the InfiniBand Trade Association (IBTA) standard. RoCE makes use of user datagram protocol (UDP) encapsulation, allowing it to transcend Layer 3 networks. RDMA is a key capability that is natively used by the InfiniBand interconnect technology. Both InfiniBand and Ethernet RoCE share a common user application programming interface (API) but have different physical and link layers.

Such use of Docker and container technology is popular and widely used in cloud computing platforms. Many containers in one physical node and cross physical nodes are interconnected by TCP/IP network to communicate with each other. In a typical production container environment, there are thousands of containers on dozens of physical nodes interconnected to the TCP/IP network. However, in a system that uses such a Docker environment, virtual network performance often suffers and CPU utilization is often observed to be high. This is caused by the large number (hundreds or more) of network interfaces on one node, including virtual network interfaces. Hence, the host OS and CPU take a much heavier network payload in a container environment than in a native machine and VM environment. Further, the network performance is affected due to software and hardware infrastructure design not being fully designed for container network. Network computing is becoming increasingly likely to be executed on the software side and with typical CPUs. For example, typical CPUs are made responsible for performing networking tasks such as TCIP packing/unpacking, network card checksum offload, network virtualization, network routing. IPTABLE based software routers implement router table operations as rule based operations, which can cause performance of the network to suffer as the rules are evaluated. Several network studies have shown that network throughput in a container environment can only reach 40-60% of that in a native network.

In one or more solutions that have been proposed for such technical problems involving network performance in a container and Docker environment, the solutions are based on using shared memory communications (SMC) in the same nodes and RDMA for different nodes. In one or more examples, data plane development kit (DPDK) libraries can also be used for the case of different nodes. Although some existing solutions minimize the performance overhead of TCP/IP software computing, only 2 nodes and 3-4 containers are practically usable, which is severely limiting. For example, in high performance computing applications, several thousands of containers are required with hundreds or more network interfaces on several more such nodes.

Additionally, existing solutions share RDMA and SMC-R devices directly across containers as a pure software implementation. This breaks container isolation. Further, it brings potential security issue, and hence, cannot be used in a production environment. Further, existing solutions abandon all hardware performance features in a data plane, like single root input/output virtualization (SR-IOV). In virtualization, SR-IOV is a specification that allows the isolation of the Peripheral Component Interconnect Express (PCIe) resources for manageability and performance reasons. For example, a single physical PCIe can be shared on a virtual environment using the SR-IOV specification. Additionally, virtual network devices are not independent in existing solutions. Resource contention and hardware/firmware errors break the serviceability and performance when there are too many containers in the existing solutions. Further yet, RDMA and shared memory is not "free", rather they are computer resource (CPU) intensive. For example, each pair of RDMA connection needs to have more than a 2 MB fixed buffer and cannot be unregistered. Also, monitoring several such RDMA queues and shared memory connections can impact performance. Further yet, the existing solutions do not work for containers in VM.

One or more embodiments of the present invention address such technical challenges/technical problems in the Docker environment. One or more embodiments of the present invention facilitate use of RDMA technology and inter-container shared memory in a graceful manner to meet requirements for a container network to ensure security, and also maintain at least a predetermined network performance. Further, at least predetermined remote access server (RAS) and quality of service (QoS) requirements are met without RDMA over-use, without CPU and RDMA over-use, and with support for RoCE multipath and RAS features.

It should be noted that although some existing solutions facilitate the Docker environment to assign a dedicated RoCE device to be shared by containers, the containers are still required to use host name space due to RDMA-case manager (RDMA-CM) limitations. Further, such solutions cannot support SR-IOV based RoCE sharing. One or more embodiments of the present invention address such technical limitations in addition to providing the advantages described herein.

One or more embodiments of the present invention address such limitations by using a hybrid network to separate the network control plane and data plane. In the data plane, one or more embodiments of the present invention facilitate use of RoCE SR-IOV for cross physical machine inter-connections and further, the use of PCIe virtual RDMA functions for cross container interconnections in one machine (internal shared memory). Further, in one or more embodiments of the present invention the network connection statistics are periodically sampled to build a direct connection priority queue based on sampled connection statistics. Further, limited RDMA functions are associated (binded) to high priority connections and virtual functions (VF) are disassociated (unbinded) from the low priority queue.

Figure 4:
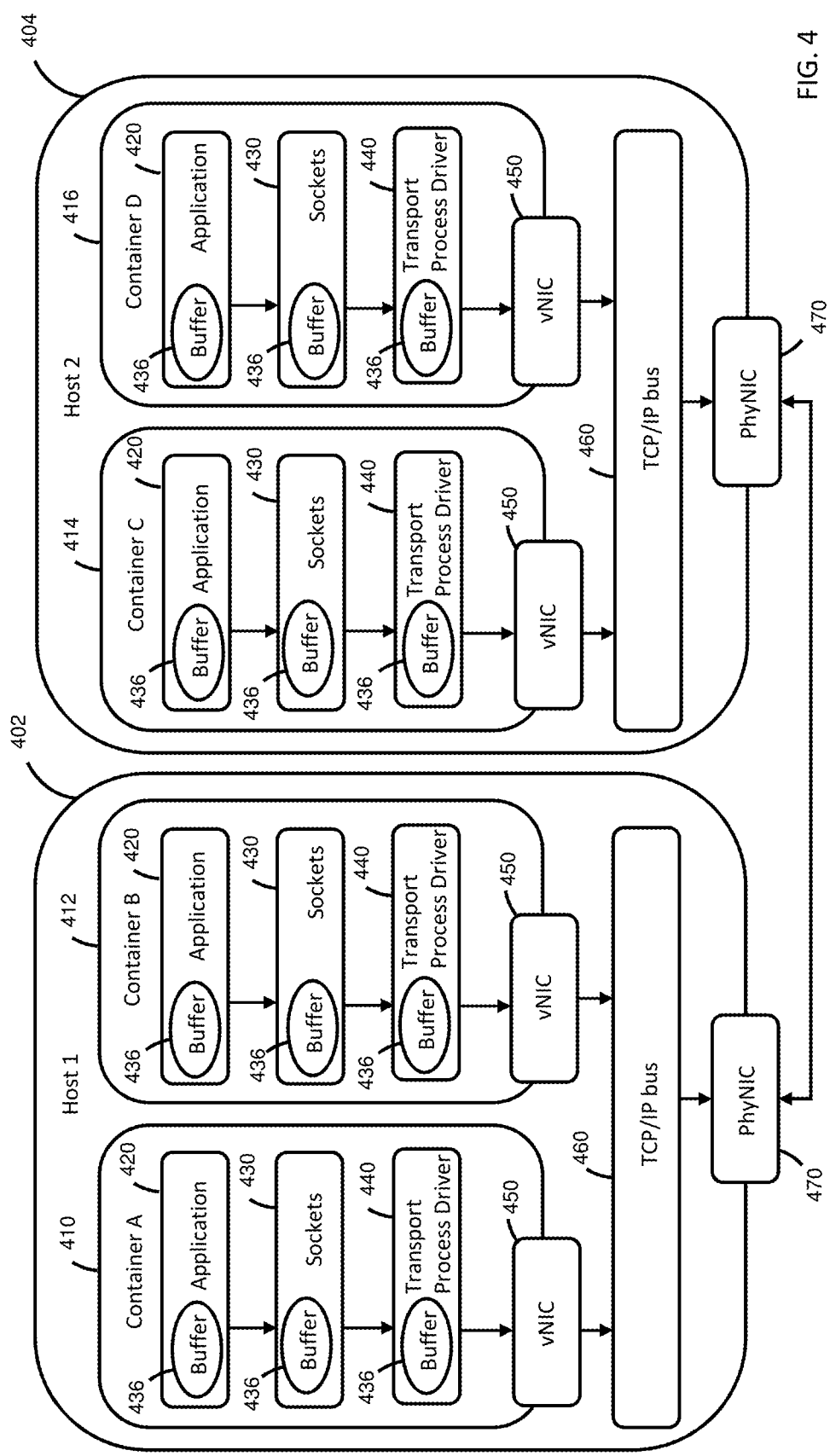
FIG. 4 depicts a block diagram illustrating communications amongst application contains of different host operating systems (OSs) utilizing transmission control protocol/Internet protocol (TCP/IP) processing according to one or more embodiments of the present invention.

FIG. 4 depicts a block diagram illustrating communications amongst application containers of different host OSs utilizing TCP/IP processing in accordance with one or more embodiments of the present invention. FIG. 4 depicts host OSs 402 and 404, each implementing two application containers for example purposes; however, the system may include any number of host OSs where each host OSs may then include any number of application containers. The host OS 402 includes application containers 410, 412 and host OS 404 includes application containers 414, 416. Each application container 410, 412, 414 and 416 includes an application 420 which may be all or part of a distributed application distributed amongst the application containers 410, 412, 414 and 416.

TCP/IP provides a mechanism for transferring bidirectional data between applications 420 of different containers. TCP/IP sockets 430 connect computer applications 420 together by utilizing buffers 436 within the applications 420, sockets 430 and transport process driver 440 to transfer the data via virtual network interfaces (vNIC) 450 to and from TCP/IP bus 460. As shown in FIG. 4, each host OS 402, 404 has a corresponding TCP/IP bus 460. In order to communicate between host OS 402 and host OS 404, the data is transferred via physical network interface devices (PhyNIC) 470. However, significant network performance issues occur as a result of networking hundreds or more application containers together utilizing TCP/IP processing.

Figure 5:
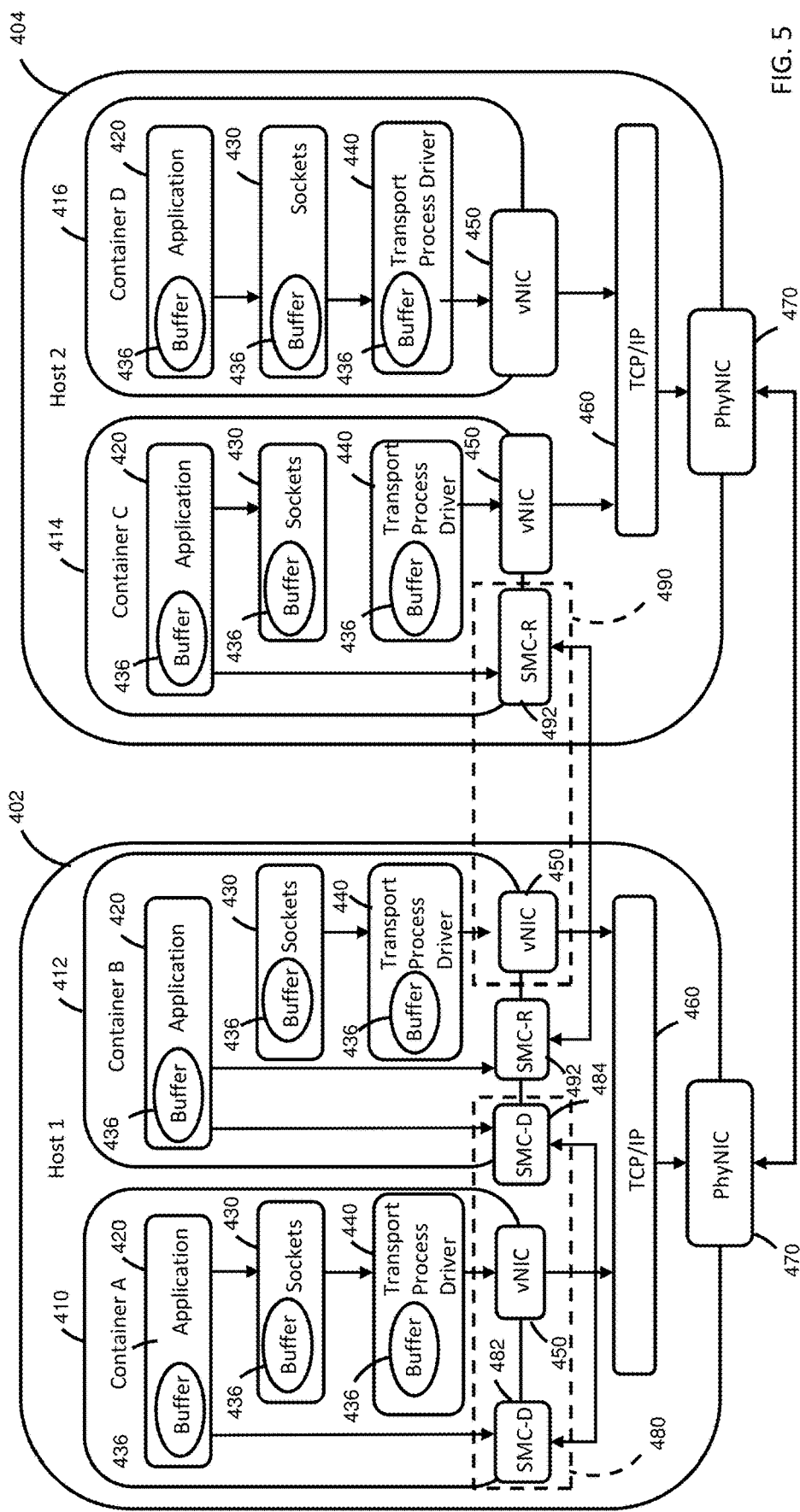
FIG. 5 depicts a block diagram illustrating communications amongst application contains of different host OSs utilizing shared memory communication via remote direct memory access (RDMA) without TCP/IP processing according to one or more embodiments of the present invention.

FIG. 5 depicts a block diagram illustrating communications amongst application containers of different host operating systems (OSs) utilizing a software solution of shared memory communications via remote direct memory access (RDMA) while maintaining application container isolation and without TCP/IP processing according to one or more embodiments of the present invention. RDMA is available on standard Ethernet-based networks by using RDMA over Converged Ethernet (RoCE) interface. In one or more embodiments, shared memory communications utilize direct shared memory communications (SMC-D) over RDMA of the application containers. For example, application containers 410 and 412 of a first host OS, such as host OS 402, can bidirectionally communicate with one another. In such a case, the communications between application containers 410 and 420 utilize the SMC-D protocol. The SMC-D protocol is a part of the OS 402, in one or more examples. As shown in block 480, SMC-D connection 482 of container 410 and SMC-D connection 484 of container 412 provide transparent communications within the host OS 402. SMC-D eliminates TCP/IP processing in the communication path which saves CPU resources.

Also, still referring to FIG. 5, application containers 420 within different host OSs can also communicate via remote shared memory communication (SMC-R) over RDMA using the SMC-D connection 484 and an SMC-R connection 492. A communication protocol for using SMC-R is provided with the OS, in one or more examples. Using SMC-R connection 492 provides communication flow between two or more hosts, as shown at block 490. For example, the application container 412 of the host OS 402 of one node can bidirectionally communicate with the application container 414 of the host OS 404 of another node. SMC-R also improves throughput, lowers latency and preserves CPU resources.

Docker can efficiently bind the SMC virtual function (VF) to container connections by using a RoCE affinity policy. The binding can be performed by referring to a parameter value, e.g. cpuprocess affinity, and selecting VFID automatically from VF pools for performance. In one or more examples, VFs whose card is closest to the container processor physically is selected for better cache locality. Further, the SMC-D, and SMC-R virtual functions are "binded" to the container network interface (PhyNIC 470) based on network type. For example, VFID is associated with container network namespace. To facilitate this, one or more embodiments of the present invention implement a command that can be invoked using a command call such as:

docker network attach-smc
<network_ns_name><container_name>[—type SMCD|SMCR|both] [—vf vfids]

Figure 6:
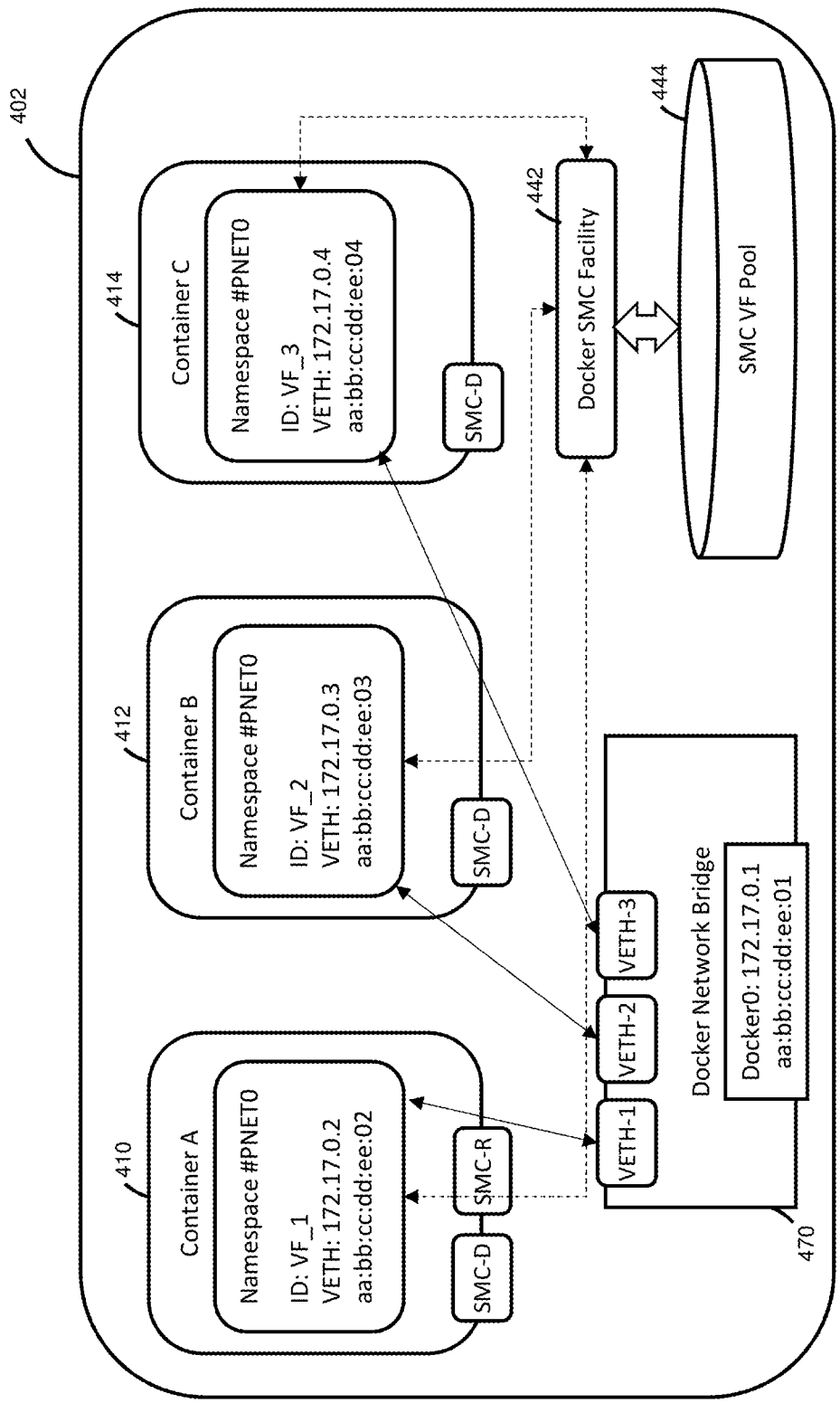
FIG. 6 depicts a block diagram of a system in which containers are network isolated by using shared memory communication (SMC) namespaces according to one or more embodiments of the present invention.

FIG. 6 depicts a block diagram of a system in which containers are network isolated by using SMC namespaces according to one or more embodiments of the present invention. Here, three containers—container A 410, container B 412, and container C 414 are depicted on a single host 402. Container B 412 and container C 414 are used for virtual functions (VFs) VF_2 and VF_3, whereas container A 410 is used for VF_1. The Docker SMC facility 442 associates the containers 410, 412, and 414 with the corresponding virtual functions from an SMC VF pool 444 of the host 402. The containers 410, 412, and 414 use different types of inter-container communications. For example, the container B 412 and container C 414 use only SMC-D for communication, while container A 410 uses SMC-D and SMC-R for the communication. The communications occur via the PhyNIC 470 network bridge that assigns virtual Ethernet ports and corresponding IP addresses to the containers 410, 412, and 414. However, all three containers 410, 412, and 414, are all attached to a common namespace (in this case PNET0).

In one or more examples, separate virtual storage extended (VSE), and/or POWER networking (PNET) configurations are setup for each of the containers 410, 412, and 414. It should be noted that virtual network interfaces 450 are not typically exposed in a global namespace in an OS. Accordingly, in one or more embodiments of the present invention, NIC and RDMA combination is done in the container namespace. Further, the PNET configuration is private to each container, and is not to be modified out of the respective container.

Accordingly, in one or more embodiments of the present invention the SMC PNET configuration is inserted into the network namespace instead of the global PNET configuration. The SMC PNET configuration is performed by binding PhyNIC 470 and RDMA devices to the same identifier, for example, the identifier of the PhyNIC 470. Further, in existing solutions, a global PNET configuration is set up using a common configuration file (e.g.: /proc/net/smc/pnet_conf (old)) and further associated with the global namespace such that pnet0→network card(eth1), and pnet0→smc device(smc-r_vf_1). Instead, in one or more embodiments of the present invention, PNET configuration is performed in network namespaces. For this, first, the configuration file /proc/net/smc/pnet_conf is moved to the network namespace of each container 410, 412, and 414, and the mapping is pnet0→network card(veth0), and pnet0→smc device(smc-r_vf_1).

The Docker SMC VF pool 444 determines the optimized setup with limited RDMA VFs for container networks. The Docker SMC VF pool 444 selects which VFs to assign to which container. The Docker SMC VF pool 444 is aware of a predetermined number of limited SMC VFs in the host 402. For example, the RoCE card supports a preset number of VFs and the host 402 has a predetermined number of RoCE cards. Accordingly, the Docker SMC VF pool 444 can determine the total number of possible VFs in the host 402. Hence, the Docker SMC VF pool 444 can further use a direct priority algorithm described further herein to find the optimized solution with limited RDMA VFs for container networks. The Docker SMC VF pool 444 can accordingly ensure container network response time restriction, minimize CPU utilization, and maximize throughput (e.g. per second).

Figure 7:
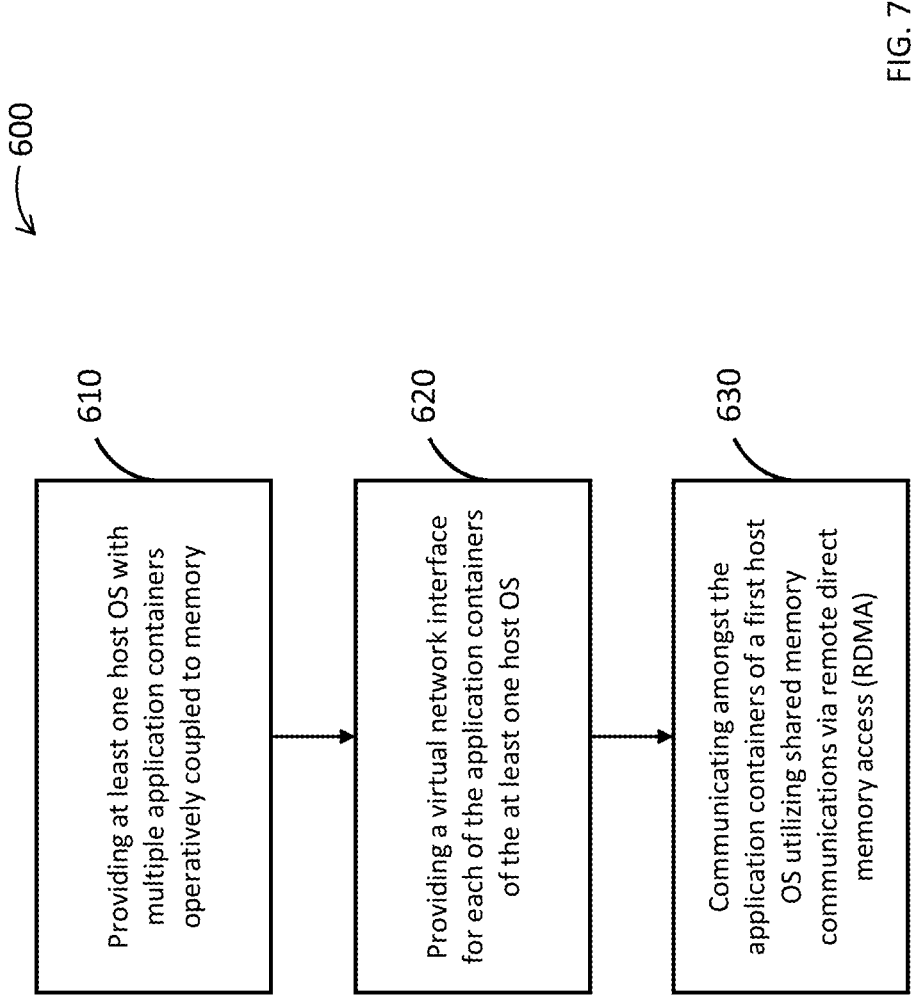
FIG. 7 is a flow diagram illustrating a method for networking across containers in a computer server system according to one or more embodiments of the present invention.

Turning to FIG. 7, one or more embodiments may include a method 600 for networking across containers in a PaaS system. The flow diagram of FIG. 7 illustrates a method 600 that includes executing multiple OSs in a computer server that includes multiple computer systems. The server includes a first computer system, for example, the host 402 that executes multiple OSs, which can include a first host OS and a second host OS. Each instance of the OS can in turn include multiple application containers 420 operatively coupled to the memory (e.g. RAM 134). The method 600 also includes a process block 620 for providing a virtual network interface 450 for each of the application containers of the at least one host OS. The method 600 further includes process block 630 for communicating amongst the application containers of a first host OS utilizing shared memory communications (SMC) via RDMA.

The computer implemented method 600 may also include one or more other process blocks. In one or more embodiments, the method 600 can include a first host OS being hosted on a first computer system and the communicating amongst the application containers of the first host OS on the first computer system includes utilizing direct memory communications (SMC-D) over RDMA via the virtual network interfaces 450 of the application containers. The method 600 can also include direct memory access amongst the application containers of the first host OS without TCP/IP processing. The method 600 can include a second host OS of a second computer system including another plurality of application containers, where the containers of the first OS host on the first computer system communicate with the application containers of the second OS host on the second computer system via remote memory communications (SMC-R) over RDMA. The method 600 may further provide shared memory communications amongst the application containers of the first and second host OSs via direct memory access via SMC-D without TCP/IP processing.

In one or more embodiments, the method 600 can include the first and second host OSs being implemented on different nodes within a cloud computing environment or the first and second host OSs being implemented on different physical nodes. Also, the method 600 may further include assigning SMC-R/SMC-D connections based on performance predictions derived from sample network connection statistics.

Figure 8:
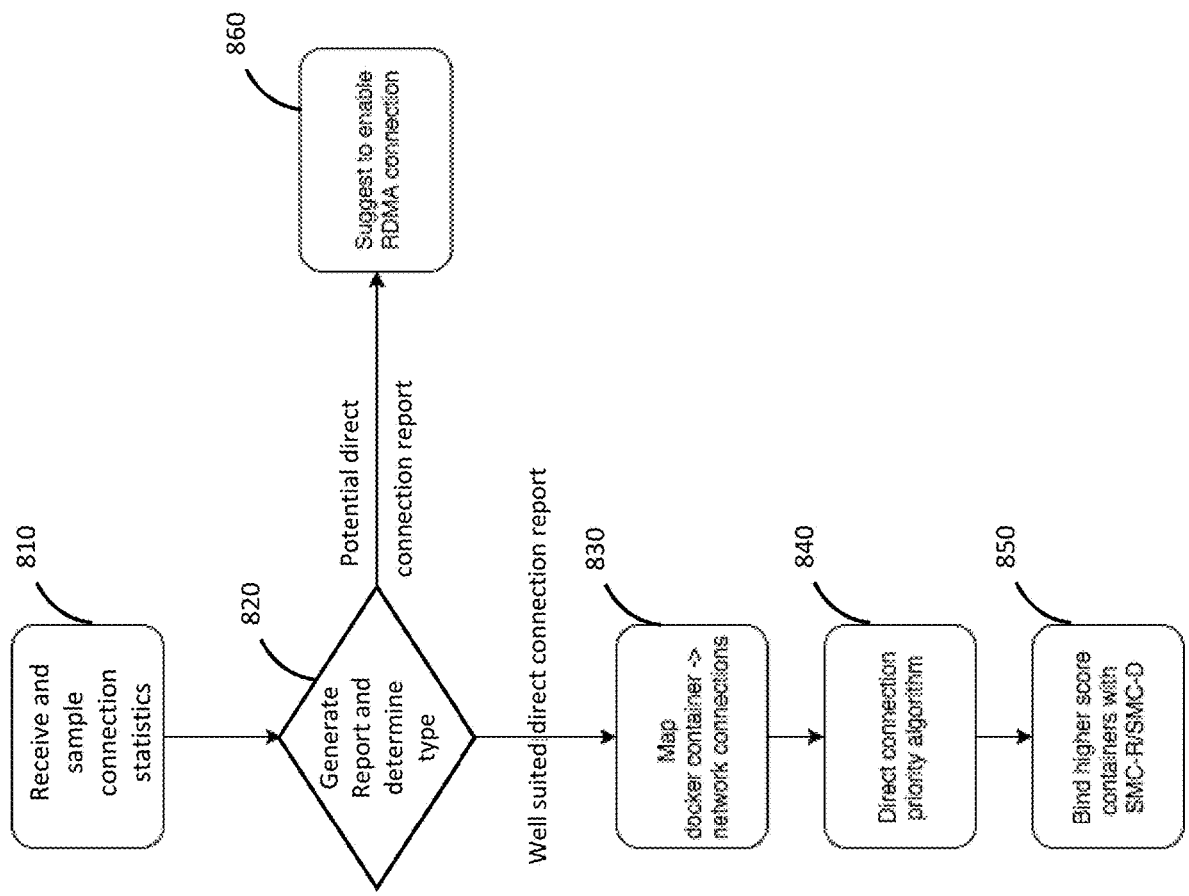
FIG. 8 depicts a flowchart of a method for performing a direct connection priority algorithm according to one or more embodiments of the present invention.

FIG. 8 depicts a flowchart of a method for performing a direct connection priority algorithm according to one or more embodiments of the present invention. The network connection statistics provide performance statistics for connection priority. For example, a direct connection report can be obtained in the Docker host. A sampling tool can get such a direct connection report with very low overhead, and substantially with no overhead on CPU side and on the network side, at 810.

FIG. 9 depicts an example sampling result according to one or more embodiments of the present invention. The sampling results 900 can contain information such as the packet size statistics for each cross container connection, sent/received IP connection average living time, among other attributes. The Docker SMC VF pool 444 determines a type of the report received from the sampling tool, at 820.

The sampling can result in two kinds of reports. First, a well suited direct connections report for input of direct connection priority queue. This does not contain data for internet protocol security (IPSec). Further in this case, RDMA devices are ready on two hosts or ISM is enabled on host. Another report indicates potential indirect connections. This contains IPSec data, and the RDMA devices are not ready in this case. Further, in one or more examples, the user can be suggested to enable RDMA connection by priority queue.

If the report is a well-suited direct connection report, the sampling result is mapped to Docker inter-container network connections, at 830. The sampling tool gets network topology from Docker (mapping IP and port to inter-container connections.). A direct connection priority algorithm is executed to generate a priority queue. The priority queue can learn a number of direction connection packets for each inter-container connection and the network statistics for each container, at 840. The direct connection priority queue uses direct connection prioritization to prioritize the containers' network connections with the well suited direct connections report. The direct connection prioritization can further use CPU statistics tool to capture and use CPU utilization in each physical node.

Further, in one or more embodiments of the present invention, a CPU sampling tool can be used to learn CPU utilization for specified modules. For example, the CPU sampling tool can be used to determine CPU utilization for specific network libraries used for the communication. The sampling is performed for a predetermined period that ensures low overhead.

The method 600 generates a direct connection priority queue based on the sample network connection statistics to sort connection by priority. The direct connection prioritization uses the well suited direct connections report in which short lived connections are already filtered out. In this manner, the input to the direct connection queue prioritization only considers long live connections. RDMA and PCIe virtual RDMA functions have their own performance characteristics, and the direct connection priority algorithm is based on: larger packet sizes benefit more from RoCE and ISM; long lived connections with frequent communications benefit more from RoCE and ISM; and high CPU utilization environments benefit more from RoCE and ISM. The goal of the prioritization is finding out optimized solution with limited RDMA VFs. The prioritization is performed with further goals to ensure container network response time restrictions, for example, cloud service provider may have QoS contract with a user for connection between container A and B, such as 4K packets have response times of less than 100 ms. Additionally, the prioritization takes into account minimization of CPU overhead on high CPU utilization environment. The prioritization is further performed to maximize total throughput per second.

In accordance with one or more embodiments of the present invention, the prioritization algorithm includes, for each connection between a container C1 and a container C2 in a container set C, determining a collection of packet sizes P={(<4K, 4K, 8K, 16K, 32K, 64K, 256K, 1M, 10M, 20M, >20M). Further, from the well suited direct connections report, determining a number of sends and receives for each packet size. The number of packets for each packet size is in set N.

The algorithm uses predetermined data that is indicative of performance data about how many CPU reductions, response time reductions, and throughput increments can occur when the packets are in different sizes.

Figure 10:
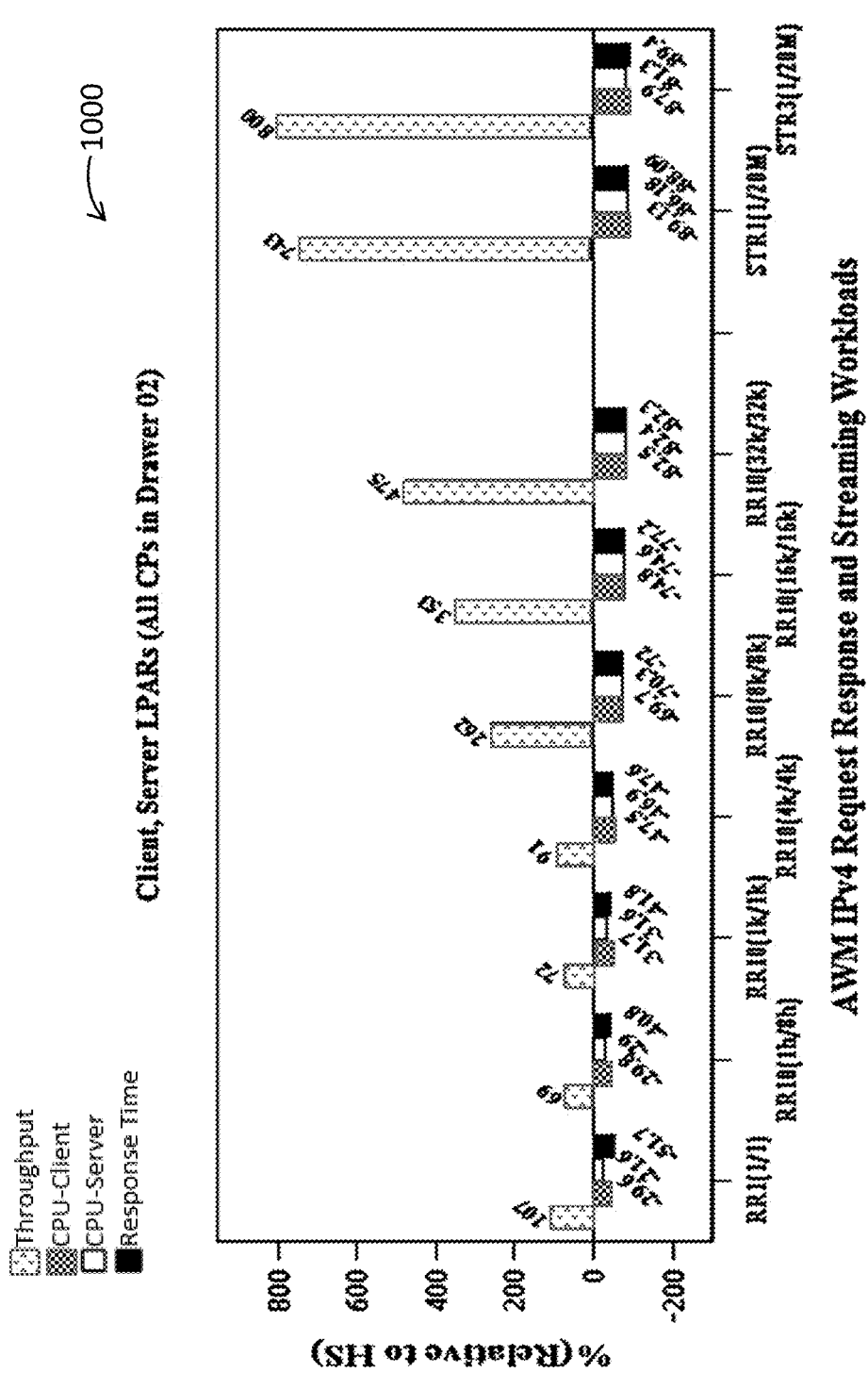
FIG. 10 depicts an example set of predetermined performance data according to one or more embodiments of the present invention.

FIG. 10 depicts an example set of predetermined performance data in a plot 1000 in accordance with one or more embodiments of the present invention. Using the performance data, predetermined constants for each packet size are determined including: reduced CPU cycles per packet size ($P_s$), reduced response time seconds per packet size ($T_s$), and throughput/transaction rate increment per packet sizes ($R_s$).

The prioritization algorithm further facilitates computing statistics about how many packets for each type of packet size are being transferred via the network communications using the above described constants and the data from the sampling results.

In one or more examples, inter-container network connection can be summarized using a matrix form as shown below, the summarization based on information related to send/recv ip in the direct connection report:

$$\begin{Vmatrix} C_{11} & C_{12} & C_{13} \\ C_{21} & C_{22} & C_{23} \\ C_{31} & C_{32} & C_{33} \end{Vmatrix},$$

$$C_{ij} = \begin{cases} 1, & \text{if container } i \text{ has traffics to container } j \\ 0, & \text{if container } i \text{ has no traffics to container } j \end{cases}$$

Next, for each none-zero $C_{ij}$, and s in S={<4K, 4K, 8K, 16K, 32K, 64K, 128K, 256K . . . }, the number of network packets for the different packet sizes are determined from the sampling tool ($N_s$). Further, the algorithm proceeds to compute benefit scores for each connection $C_{ij}$:

$$B_{ij} = \text{Coef}_P * \Sigma N_s * P_s + \text{Coef}_T * \Sigma N_s * T_s + \text{Coef}_R * \Sigma N_s * R_S s \text{ in}$$
$$S = \{<4K, 4K, 8K, 16K, 32K, 64K, 128K, 256K \ldots\};$$

$$B_{ij} = 0 \text{ if } C_{ij} = 0$$

Here, $\text{Coef}_p$ is a coefficient factor that is an adjustable value that is set up according to the target goal. After calculation, a benefits score matrix B is obtained:

$$\begin{Vmatrix} B_{11} & B_{12} & B_{13} \\ B_{21} & B_{22} & B_{23} \\ B_{31} & B_{32} & B_{33} \end{Vmatrix} B_{ij}$$

quantifies benefit of using SMC-R for network communication from container i to container j over SMC-D (or vice versa).

A 0/1 matrix X can be defined to include the variants of VF enable/disable:

$$\begin{Vmatrix} X_{11} & X_{12} & X_{13} \\ X_{21} & X_{22} & X_{23} \\ X_{31} & X_{32} & X_{33} \end{Vmatrix}$$

$$X_{ij} = \begin{cases} 1, & \text{if } VF \text{ enabled container } i \rightarrow j \\ 0, & \text{if } VF \text{ not enabled container } i \rightarrow j \end{cases}$$

Using the notation discussed herein, the technical problem to be solved by the Docker SMC facility is how to assign the limited VFs to containers, which can be solved using 0-1 programming. In other words, the problem is expressed as: Maximize $$\sum_{\substack{1 \leq i \leq n \\ 1 \leq j \leq n}} Bij * X_{ij},$$

n is the total containers, subject to the conditions: $X_{11} + X_{12} + \ldots + X_{1n} \leq \min(\text{VF \#}, n)$, $X_{21} + X_{22} + \ldots + X_{2n} \leq \min(\text{VF \#}, n) \ldots$, and $X_{n1} + X_{n2} + \ldots + X_{nn} \leq \min(\text{VF \#}, n)$, $X_{ij} = x_{ji}$, and $\text{BIN}(X_{ij})$, (BIN(X) function, X either 0 or 1).

The above calculations include:

Total CPU benefits=$\text{BENEFIT}^P = \Sigma_{n \text{ in } P}(N_n P_n)$

Total Response benefits=$\text{BENEFIT}^T = \Sigma_{n \text{ in } P}(N_n T_n)$

Total Throughput benefits=$\text{BENEFIT}^R = \Sigma_{n \text{ in } P}(N_n R_n)$ Further, the algorithm includes computing a score per $e^{th}$ interface to specify target in container as:

$$S_e = C_P \text{BENEFIT}^P + C_T \text{BENEFIT}^T + C_R \text{BENEFIT}^R$$

The calculation continues to determine a total score as: Max(Sum (c in Container), Sum (RDMA networks interfaces of Container C), Sum (Connections to RDMA network interface), $S_e$).

Referring to the flowchart in FIG. 8, the total score is used to bind the one or more containers with the highest score with SMC-R and SMC-D, at 850.

Further, in case of a potential direct connection reported at 820 of FIG. 8, the algorithm includes suggesting enabling an RDMA connection of a particular type between the containers, at 860.

Figure 11:
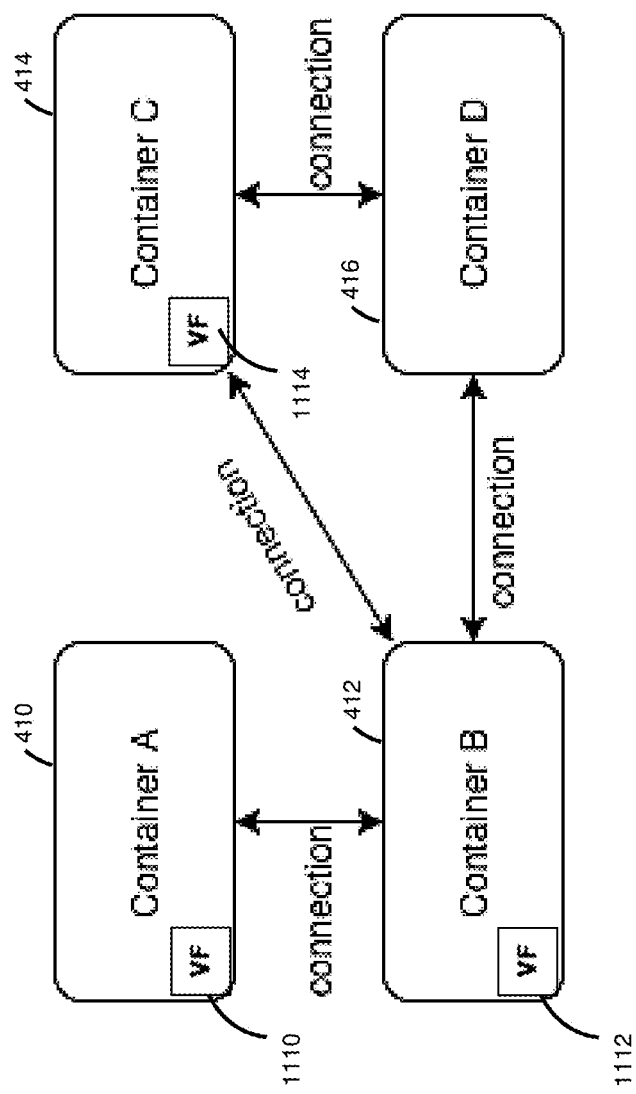
FIG. 11 depicts an example scenario according to one or more embodiments of the present invention.

FIG. 11 depicts an example scenario according to one or more embodiments of the present invention. Consider a network container system where 4 containers (410, 412, 414, and 416), and 3 SMC-R/SMC-D VFs (1110, 1112, and 1114) are available. In order to achieve the max throughput for the whole distributed system, the algorithm calculates total benefits for each size of packets and each connection between the containers (410, 412, 414, and 416), and dynamically assigns VF (1110, 1112, and 1114) to the containers (410, 412, 414, and 416). For example, consider that by sampling and dynamically calculating benefits for each connection $B_{A\leftrightarrow B}$, $B_{B\leftrightarrow C}$, $B_{C\leftrightarrow D}$, and $B_{B\leftrightarrow D}$, only 3 containers bind with the VF:

$$T1(A,B,C)=B_{A\leftrightarrow B}+B_{B\leftrightarrow C}$$

$$T2(A,B,D)=B_{A\leftrightarrow B}+B_{B\leftrightarrow D}$$

$$T3(A,C,D)=B_{C\leftrightarrow D}$$

$$T4(B,C,D)=B_{B\leftrightarrow C}+B_{C\leftrightarrow D}+B_{B\leftrightarrow D}$$

Suppose T1>T4>T2>T3, then container A 410, B 412, and C 414 are the candidates for SMC-R/D VF assignees for better performance of the systems.

According to one or more embodiments of the present invention the parameters used in the above calculations are constrained using one or more predetermined constraints. For example, the constraints can include, but are not limited to: the response time is between C1 and C2 which are both less than 100 milliseconds; and the throughput of each network interface is less than the ideal throughput for each packet size.

Various technical benefits are achieved using the system and methods described herein, including the capability of providing enhanced performance for applications with exclusive access to the co-processors while also allowing applications that do not need performance access to accelerators when shared access is available. In this manner, the computing device can realize performance gains through the use of co-processors in the system, thereby improving overall processing speeds.

As described herein, one or more embodiments of the present invention facilitate dynamically assigning SMC-R/SMC-D connections to accelerate key paths in container network by performance predictions. The advantages of the practical application provided by one or more embodiments of the present invention include providing a high performance Docker SMC facility for attaching/detaching VF to container network interface controller (NIC) in an isolated way. This further facilitates using RoCE SR-IOV virtual functions for cross physical machine inter-connections, using SMC-R. Further, PCIE virtual functions can be used for cross containers interconnections in a single machine using SMC-D. Further yet, the Docker SMC facilitates, according to one or more embodiments of the present invention, SMC namespace separation and SR-IOV to ensure RoCE interface isolation.

According to one or more embodiments of the present invention a direct connection priority queue is created based on network connection statistics to sort connections by priority. The network connection statistics are sampled at a predetermined rate to generate one or more reports, such as a direct connection report, that are used for such sorting. The sorting can be performed using a direct connection sorting algorithm described herein. In one or more embodiments of the present invention the Docker SMC VF pool is further used to deploy SMC-R, SMC-D connections automatically based on the priority queue.

Accordingly, one or more embodiments of the present invention facilitate network isolation for one or more containers, and alleviate network communication pressure among Docker containers by using a combination of SMC-D and SMC-R. Further, as described herein, one or more embodiments of the present invention determine an optimal strategy for SMC-D and SMC-R combination.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for network communication across application containers in a computer server system, the method comprising:

executing, by a computer system, a host operating system (OS), the host OS being an instance of an OS, the host OS comprising a plurality of application containers operatively coupled to a memory;

executing, by the host OS, a virtual network interface for each of the application containers; and implementing, by the host OS, a remote direct memory access (RDMA) transparently for communications amongst the application containers by utilizing shared memory communications.

2. The method of claim 1, wherein the host OS is a first host OS hosted on a first computer system, and wherein implementing the RDMA between a first application container and a second application container from the application containers of the first host OS, comprises utilizing direct shared memory communications (SMC-D) over RDMA via the respective virtual network interfaces of the first application container and the second application container, both the first application container and the second application container being hosted on the first computer system.

3. The method of claim 2, further comprising providing direct memory access amongst the first application container and the second application container of the first host OS without transmission control protocol/Internet protocol (TCP/IP) processing.

4. The method of claim 2, wherein the computer server system further comprises a second computer system that executes a second host OS, the second host OS comprising another plurality of application containers, and wherein implementing the RDMA for communicating between the first application container of the first host OS on the first computer system and a third application container of the second host OS that is being hosted on the second computer system comprises using remote shared memory communications (SMC-R) over RDMA.

5. The method of claim 4 further comprising, providing shared memory communications amongst the first application container of the first host OS and the third application container of the second host OS via direct memory access via SMC-D without transmission control protocol/Internet protocol (TCP/IP) processing.

6. The method of claim 5, further comprising, implementing the RDMA further comprises, communicating between the first application container of the first host OS on the first computer system and a third application container of a third host OS on the second computer system using remote memory communications (SMC-R) over RDMA, wherein host-to-host direct memory access is without TCP/IP processing.

7. The method of claim 4, wherein the first computer system and the second computer system are different nodes within a cloud computing environment.

8. The method of claim 4, wherein the first computer system and the second computer system are different physical nodes.

9. The method of claim 4, further comprising assigning SMC-R/SMC-D connections based on performance predictions derived from sample network connection statistics.

10. The method of claim 9, further comprising generating a direct connection priority queue based on the sample network connection statistics to sort the SMC-R/SMC-D connections by priority.

11. A system comprising:
a computer system that comprises a memory, and a processor coupled with the memory, the first computer system configured to perform a method for providing communication between application containers hosted in the system, the method comprising:
executing a host operating system (OS), the host OS being an instance of an OS, the host OS comprising a plurality of application containers operatively coupled to the memory; and
executing a virtual network interface for each of the application containers of the host OS, wherein
communications amongst the application containers of the host OS is performed utilizing shared memory communications to implement remote direct memory access (RDMA) transparently.

12. The system of claim 11, wherein the host OS is a first host OS hosted on a first computer system and wherein implementing the RDMA between a first application container and a second application container from the application containers of the first host OS, comprises utilizing direct shared memory communications (SMC-D) over RDMA via the respective virtual network interfaces of the first application container and the second application container, both, the first application container and the second application container being hosted on the first computer system.

13. The system of claim 12, further comprising a second computer system that executes a second host OS, the second host OS comprising another plurality of application containers, and wherein implementing the RDMA for communicating between the first application container of the first host OS on the first computer system and a third application container of the second host OS that is being hosted on the second computer system comprises using remote shared memory communications (SMC-R) over RDMA.

14. The system of claim 13, wherein the shared memory communications via RDMA are provided via SMC-R/SMC-D without TCP/IP processing.

15. The system of claim 13, wherein the first computer system and the second computer system are different nodes within a cloud computing environment.

16. The system of claim 13, wherein the method further comprises assigning SMC-R/SMC-D connections based on performance predictions derived from sample network connection statistics.

17. The system of claim 16, further comprising generating a direct connection priority queue based on the sample network connection statistics to sort the SMC-R/SMC-D connections by priority.

18. A computer program product comprising a computer readable storage medium having program instructions embodied therewith, the program instructions executable by a computer processor to cause the computer processor to perform a method for implementing networking communication across application containers in a computer server system, the method comprising:
executing, by a computer system from the computer server system, a host operating system (OS), the host OS being an instance of an OS, the host OS comprising a plurality of application containers operatively coupled to a memory;
executing, by the host OS, a virtual network interface for each of the application containers; and
implementing, by the host OS, a remote direct memory access (RDMA) transparently for communications amongst the application containers by utilizing shared memory communications.

19. The computer program product of claim 18, wherein the host OS is a first host OS hosted on a first computer system and wherein implementing the RDMA between a first application container and a second application container from the application containers of the first host OS, comprises utilizing direct shared memory communications (SMC-D) over RDMA via the respective virtual network interfaces of the first application container and the second application container, both, the first application container and the second application container being hosted on the first computer system.

20. The computer program product of claim 19, wherein the computer server system further comprises a second computer system that executes a second host OS, the second host OS comprising another plurality of application containers, and wherein implementing the RDMA for communicating between the first application container of the first host OS on the first computer system and a third application container of the second host OS that is being hosted on the second computer system comprises using remote shared memory communications (SMC-R) over RDMA.

\* \* \* \* \*